(12) United States Patent
McNalley et al.

(10) Patent No.: US 6,655,704 B2
(45) Date of Patent: Dec. 2, 2003

(54) REDUNDANT INNER TIE ROD ASSEMBLY AND ASSEMBLY METHOD

(75) Inventors: Brian Jack McNalley, Hemlock, MI (US); Lynn Charles Krom, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/836,872

(22) Filed: Apr. 17, 2001

(65) Prior Publication Data

US 2002/0148671 A1 Oct. 17, 2002

(51) Int. Cl.[7] .................................................. B62D 7/20
(52) U.S. Cl. .............................. 280/93.511; 280/93.503; 403/315
(58) Field of Search ........................ 280/93.502, 93.503, 280/93.511; 403/141, 142, 143, 315, 316

(56) References Cited

U.S. PATENT DOCUMENTS

| | | | | | |
|---|---|---|---|---|---|
| 1,220,595 | A | * | 3/1917 | Blackburn | 280/93.511 |
| 2,208,325 | A | * | 7/1940 | Krutsch | 280/93.511 |
| 2,456,793 | A | * | 12/1948 | Reed et al. | 280/93.511 |
| 2,474,959 | A | * | 7/1949 | Rieves | 280/93.511 |
| 2,483,621 | A | * | 10/1949 | Burnett | 280/93.511 |
| 2,852,288 | A | * | 9/1958 | Booth | 280/93.511 |
| 2,928,687 | A | * | 3/1960 | Latzen | 280/93.511 |
| 4,865,145 | A | * | 9/1989 | Ijiri et al. | 180/444 |
| 5,799,968 | A | * | 9/1998 | Loeffler | 280/93.511 |
| 6,422,779 | B1 | * | 7/2002 | Spagnuolo | 280/93.511 |

* cited by examiner

*Primary Examiner*—Daniel G. DePumpo
(74) *Attorney, Agent, or Firm*—Michael D. Smith

(57) ABSTRACT

The rack and pinion vehicle steering assembly has a steering rack slidably supported in a rack and pinion housing. An inner tie rod housing has a shank that screws into a threaded rack bore. A housing chamber receives an inner end ball and an open end of the housing chamber is crimped to retain the inner end ball. An inner support nut screws onto the steering rack and into contact with the tie rod housing. An inner support clamp has a central passage that receives an inner rod that is fixed to the inner end ball. Internal clamp threads on the clamp rim of the inner support clamp engage male threads on the inner support nut to retain the clamp and encase the tie rod housing and the inner end ball.

10 Claims, 3 Drawing Sheets

REDUNDANT INNER TIE ROD ASSEMBLY AND ASSEMBLY METHOD

TECHNICAL FIELD

The redundant inner tie rod assembly protects against failure of a primary inner tie rod connection to the rack of a rack and pinion steering system.

BACKGROUND OF THE INVENTION

The inner tie rod of a vehicle steering system is connected to a steering arm and to the rack of a rack and pinion steering system. The connection between the inner tie rod and the rack must accommodate pivotal movement about a plurality of axes. A ball and socket connection is therefore the preferred connection.

Ball and socket connections can fail occasionally. Failures, if they do occur, are generally due to lack of lubrication, extensive use over a period of years or excessive forces applied to the joint. Such failures may involve failure of the threads that hold either the ball or the socket in place, or failure of the inner tie rod housing crimp that holds the ball in the inner tie rod housing or socket. A worn or loose ball and socket as well as loose threads can be identified by excess play in the steering wheel when the ball and socket are part of a front wheel steering system. Detection of a worn ball and socket or loose thread connections in a rear wheel steering system of a vehicle with four wheel steering is more difficult. Looseness in a rear wheel steering system, indicating that the threads or the housing crimp that hold a ball in the housing need to be inspected or repaired, may not be detectable by turning the steering wheel.

The front steered wheels of a vehicle have a steering geometry that includes caster, camber and toe in. This geometry tends to turn the steered front wheels to a position that directs a vehicle straight forward if the operator releases the steering wheel or if there is a steering linkage failure.

The rear wheels of a vehicle with four wheel steering generally have negative caster. A failure in the steering linkage of the rear wheels of a vehicle may therefore make the vehicle unstable.

SUMMARY OF THE INVENTION

A vehicle has a body supported by front steered wheels and rear steered wheels. A rear rack and pinion steering system having a rack driven by a pinion. A first inner tie rod transmits steering forces from the rack to one of the rear steered wheels. The first inner tie rod is connected to the rack by a primary inner tie rod connector as well as by a redundant inner tie rod connector.

The redundant inner tie rod assembly includes a steering rack and pinion housing. A steering rack is supported in the steering rack housing for axial movement relative to the rack and pinion housing. A steering rack first end extends out of the rack and pinion housing. An inner support nut is fixed to the steering rack first end. An inner tie rod has a tie rod inner end. An inner tie rod housing receives an inner end ball that is retained in the inner tie rod housing and is pivotable relative to the inner tie rod housing. The inner end ball and the inner tie rod housing interconnect the steering rack first end and the tie rod inner end. An inner support clamp with a central passage telescopically receives the inner tie rod. A clamp outer flange is mechanically connected to the inner support nut and limits separation of the inner tie rod end from the steering rack first end.

BRIEF DESCRIPTION OF THE DRAWINGS

Presently preferred embodiments of the invention are disclosed in the following description and in the accompanying drawings, wherein.

DESCRIPTION OF PREFERRED EMBODIMENT

Figure 1:
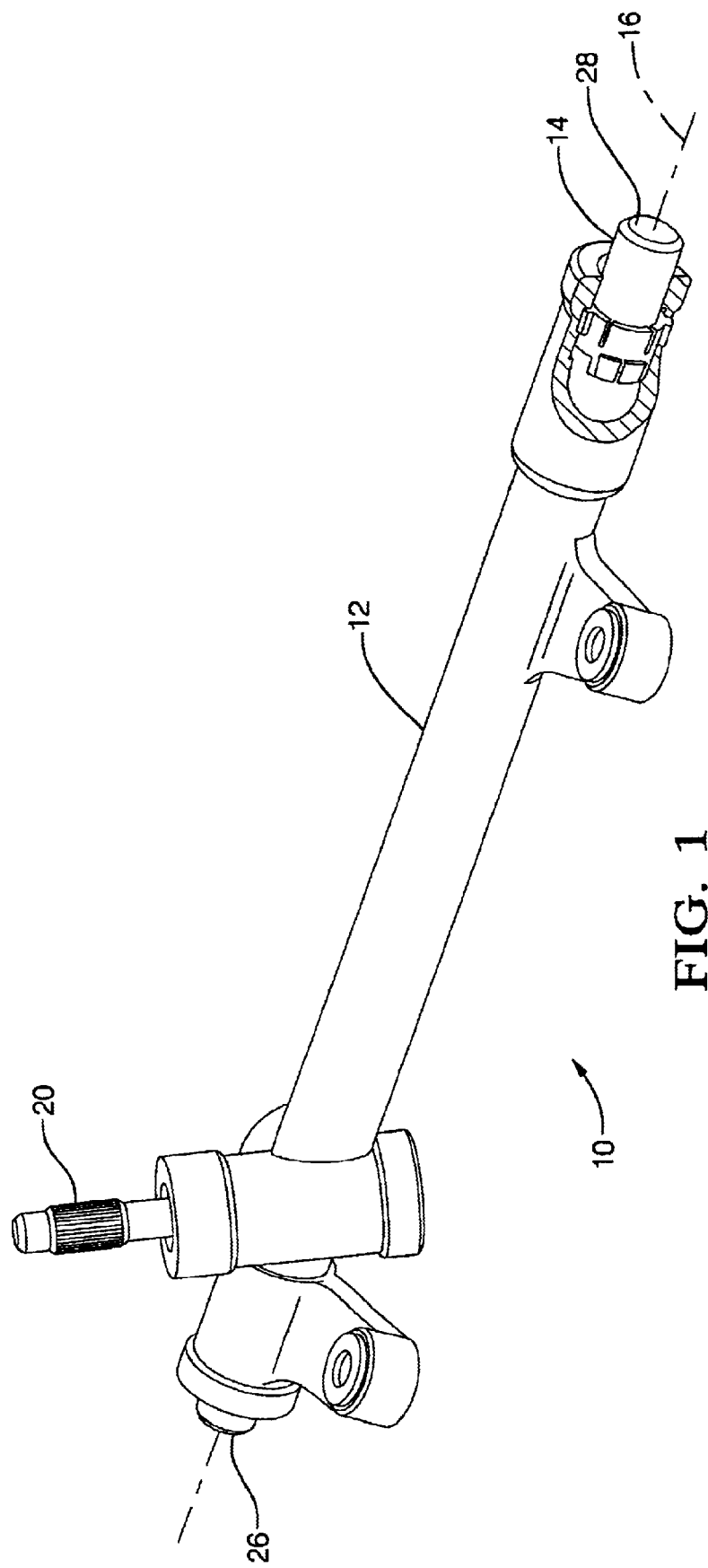
FIG. 1 is a perspective view of a rack and pinion drive for a vehicle steering system without an inner tie rod.

The rack and pinion vehicle steering assembly 10 includes a rack and pinion housing 12. A steering rack 14 is slideably mounted in the housing 12 for axial movement along a rack axis 16. A pinion gear 18, on a pinion shaft 20 journaled in the housing 12, drives the rack 14 back and forth along the rack axis 16. The pinion shaft 20 is driven by a controller when the steering rack 14 steers the rear wheels of a vehicle with four wheel steering. When the steering rack 14 steers the front wheels of a vehicle, the pinion shaft 20 is connected to a vehicle steering wheel by a steering shaft assembly (not shown). The pinion gear 18 has pinion gear teeth 22 that mesh with rack teeth 24.

The steering rack 14 as shown in FIG. 1 has a steering rack first end 26 and a steering rack second end 28. The rack 14 can have an inner tie rod assembly 46 attached to the rack first end 26 and another inner tie rod attached to the rack second end 28. Only one inner tie rod assembly 46 is attached to some steering racks 14. Only one inner tie rod assembly 46 is shown in the drawing. An inner tie rod attached to the steering rack second end 28, in a system having two inner tie rods, would be identical to the inner tie rod assembly 46 attached to steering rack first end 26.

The steering rack first end 26 has a steering rack bore 32 that is concentric with the rack axis 16. The rack bore 32 is preferably a threaded rack bore 34. The rack first end 26 also has an external threaded portion 36.

The redundant inner tie rod assembly 38 has an inner support nut 40 with nut female threads 42 and nut male threads 44. The nut female threads 42 engage the external threaded portion 36 on the rack first end 26. As shown in the drawing the inner support nut 40 is connected to the steering rack 14 before the inner tie rod assembly 46 is attached.

The inner tie rod connector assembly 46 includes an inner tie rod housing 48 and an inner end ball 50. The housing 48 has a shank 52 and a housing chamber 54. A shank threaded portion 56 screws into the threaded rack bore 34 to secure the tie rod housing 48 to the steering rack 14. The housing chamber 54 has an open end 58. A first bearing 60 is mounted in the chamber 54. The inner end ball 50 is seated on the first bearing 60. A second bearing ring 62 is telescopically received on the ball shank 64, seated on the inner end ball 50 and received in the housing chamber 54. The open end 58 of the housing chamber 54 is crimped to retain the second bearing ring 62 and the inner end ball 50 in the housing chamber.

The ball shank 64 is an integral part of the tie rod inner end 67 of the inner rod 66.

Figure 2:
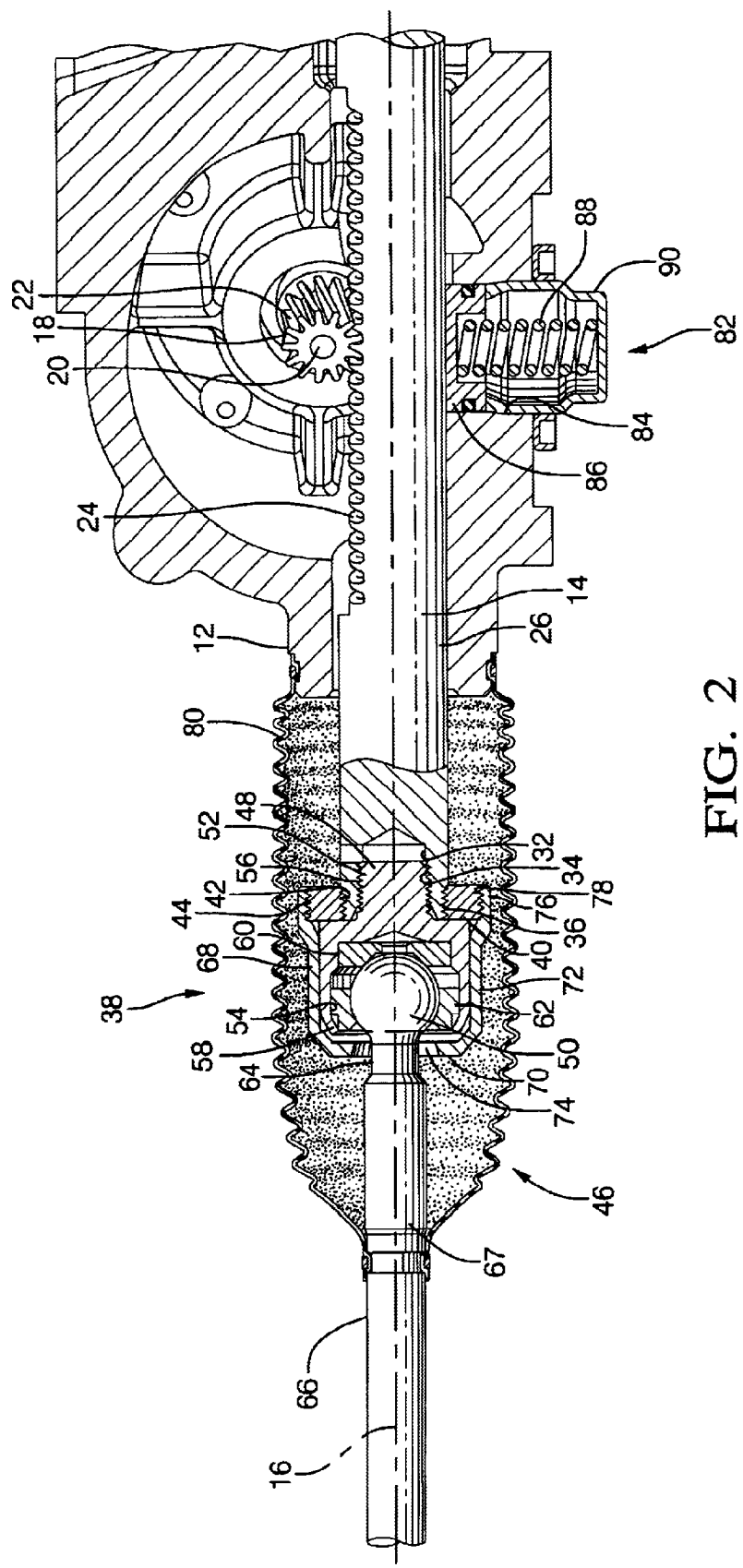
FIG. 2 is a vertical sectional view of an end of the rack and pinion drive and the inner end of an inner tie rod assembly.

The redundant inner tie rod assembly 38, as set forth above, has an inner support nut 40. The nut 40 is tightened against the tie rod housing 48 after the tie rod housing 48 is fixed to the steering rack 1. An inner support clamp 68, of the redundant inner tie rod assembly 38, is a cup-shaped member with a bottom wall 70 and side walls 72. A central passage 74 is provided in the bottom wall 70 that is sufficiently large in diameter to accommodate pivotal movement of the inner ball 50 relative to the inner tie rod housing 48. The clamp rim 76 of the side walls 72 has internal clamp threads 78 that engage the nut male threads 44 and hold the inner sup ort clamp 68 in a fixed position relative to the steering rack 14. In the position shown in FIG. 2, the inner support clamp 68 holds the inner end ball 50 in a working position in the even that the connection between the shank 52 of the inner tie rod housing 48 and the steering rack 14 fails. The inner support clamp 68 also holds the inner end ball 50 in a working position in the event of a failure of the crimped open end 58 of the housing chamber 54 thereby free g the second bearing ring 62 to move out of the tie rod housing 48.

A flexible boot 80 is connected to the rack and pinion housing 12 and to the inner rod 66 in positions in which the inner tie rod assembly 46 and the redundant tie rod assembly 38 are sealed from water, dust and other contaminants.

A spring assembly 82 includes a bore 84 in the rack and pinion housing 12. A rack bearing 86 in the bore 84 is biased into engagement with the rack 14 by a spring 88. The spring 88 is retained by an adjuster plug 90 that screws into the bore 84. The damper assembly 82 resists movement of the rack 14 when the pinion gear 18 is stationary and biases the rack toward the pinion gear.

A number of modifications can be made in the inner tie rod assembly 46 and the redundant inner tie rod assembly 38 as described above. The inner end ball 50 could be fixed to the steering rack 14 and the inner tie rod housing 48 could be fixed to the inner tie rod 60. The inner support nut 40 could be an integral part of the steering rack 14. The threaded connectors could be replaced by lock rings or other connecting members. The shape of the inner support clamp 68 and the inner support nut 40 could be changed substantially. Both the clamp 68 and the nut 40 could be cup-shaped or the nut could be cup-shaped and the clamp could be a plate member.

Figure 3:
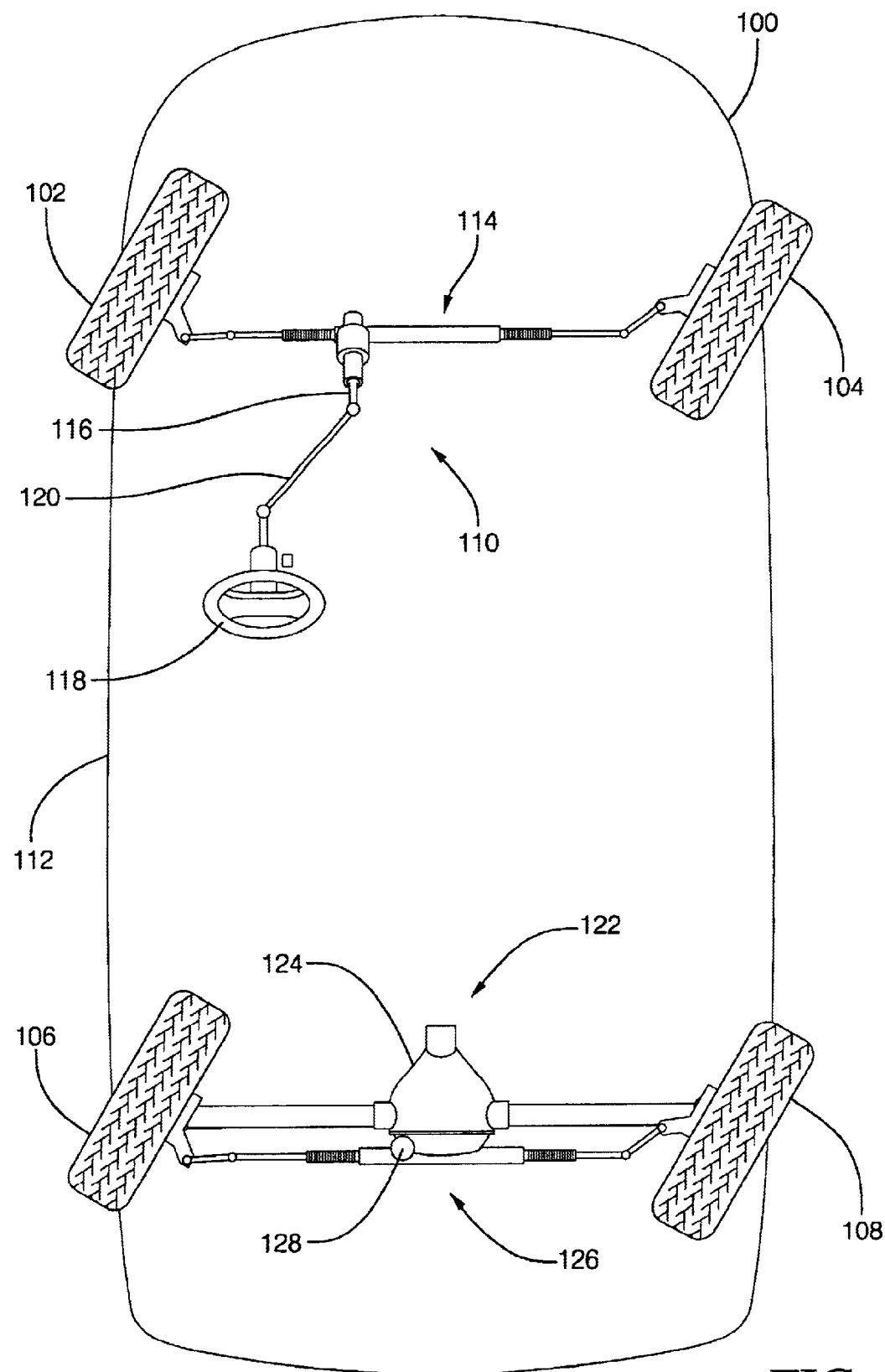
FIG. 3 is a diagrammatic plan view of a vehicle with four wheel steering.

A vehicle 100 with front steered wheels 102 and 104 and rear steered wheels 106 and 108 is shown in FIG. 3. A front rack and pinion steering system 110 steers the front wheels 102 and 104. The front wheels are connected to the vehicle body 112 by a suspension system (not shown). These front wheels are driven in some vehicles 100 and non-driven in other vehicles. The rack and pinion housing 114 is mounted on the vehicle body 112. The pinion shaft 116 is connected to a steering wheel 118, in the operator's compartment, by a steering shaft assembly 120.

The rear wheels 106 and 108 are driven by a rear drive axle assembly 122 as shown. The rear wheels 106 and 108 can be non-driven wheels if desired. The differential and axle housing 124 is connected to the vehicle body 112 by a rear wheel suspension system (not shown). A rear rack and pinion steering system 126 is mounted on the axle housing 124. A controller 128 drives the pinion of the rear rack and pinion system 126 to steer the rear wheels 106 and 108. The rear rack and pinion steering system 126 is the rack and pinion vehicle steering assembly 10 shown in FIGS. 1 and 2 and described above.

The disclosed embodiments are representative of presently preferred forms of the invention, but are intended to be illustrative rather than definitive thereof. The invention is defined in the claims.

What is claimed is:

1. A redundant inner tie rod assembly comprising:
    a steering rack an pinion housing;
    a steering rack supported in the steering rack and pinion housing for axial movement relative to the steering rack and pinion housing;
    a steering rack firs end extending out of the steering rack and pinion housing;
    a support member fixed to a radially outer surface on the steering rack first end;
    a rod with a tie rod inner end;
    a tie rod housing;
    an end ball integral with the tie rod inner end, retained in the tie rod housing and pivotable relative to the tie r d housing and wherein the tie rod housing is connected to a steering rack bore in the steering rack first end; and
    a support clamp with a central passage that telescopically receives the rod and wherein said support clamp is mechanically connected to said support member to limit separation of the tie rod inner en from the steering rack first end.

2. A redundant inner tie rod assembly as set forth in claim 1 including an internal clamp threaded portion on said support clamp that engages a support member threaded portion on said support member.

3. A redundant inner tie rod assembly as set forth in claim 1 wherein the tie rod housing has a housing shank threaded portion that screws into a threaded rack bore in the steering rack first end.

4. A redundant inner tie rod assembly, as set forth in claim 1, wherein said support clamp transmits steering forces between the rod and the steering rack when the tie rod fails to transmit steering forces in two directions.

5. A redundant inner tie rod assembly comprising:
    a steering rack and pinion housing;
    a steering rack supported in the steering rack and pinion housing for axial movement along a rack axis and relative to the steering rack and pinion housing;
    a steering rack first end having a steering rack bore and a rack external threaded portion on the steering rack first end;
    an inner support nut with a nut female threaded portion that engages the rack external threaded portion and a support nut male threaded portion;
    an inner tie rod housing with a housing open end and a housing threaded end that screws into the steering rack bore and into engagement with the inner support nut;
    an inner rod with an inner end ball that is pivotally received in the housing open end and retained in place by crimping the housing open end; and
    an inner support clamp having a cup-shaped body with a bottom wall, a side wall, a clamp rim, a clamp central passage through the bottom wall and wherein the clamp central passage telescopically receives the inner rod, the clamp rim has internal clamp threads that engage the support nut male threaded portion and the inner support clamp and the inner support nut encase the inner tie rod housing and the inner end ball.

6. A redundant inner tie rod assembly as set forth in claim 5 including a flexible boot that is connected to the steering rack and pinion housing and to the inner rod and encases the inner tie rod housing, the inner end ball, the inner support nut and the inner support clamp.

7. A redundant inner tie rod assembly as set forth in claim 5 wherein the inner support nut is rotated relative to the steering rack and advanced by the threaded portion into engagement with the inner tie rod housing.

8. A redundant inner tie rod assembly comprising:

a steering rack an pinion housing;

a steering rack supported in the steering rack and pinion housing for axial movement relative to the steering rack and pinion housing;

a steering rack firs end extending out of the steering rack and pinion housing;

a support member fixed to the steering rack first end;

a rod with a tie rod inner end;

a tie rod housing;

an end ball retained in the tie rod housing and pivotable relative to the tie rod housing and wherein the end ball and the tie rod housing interconnect the steering rack first end and the tie rod inner end;

a support clamp with a central passage that telescopically receives the rod and wherein said support clamp is mechanically connected to said support member to limit separation of the tie rod inner en from the steering rack first end; and including an internal clamp threaded portion on said support clamp that engages a support member threaded portion on said support member.

9. A redundant inner tie rod assembly, as set forth in claim 8, wherein said support clamp transmits steering forces between the rod and the steering rack when the tie rod housing fails to transmit forces in two directions.

10. A method of assembling a redundant inner tie rod assembly comprising:

a steering rack and pinion housing;

a steering rack supported in the steering rack and pinion housing for axial movement relative to the steering rack and pinion housing;

a steering rack first end extending out of the steering rack and pinion housing;

a support member fixed to the steering rack first end;

a rod with a tie rod inner end;

a tie rod housing;

an end ball retained in the tie rod housing and pivotable relative to the tie rod housing and wherein the end ball and the tie rod housing interconnect the steering rack first end and the tie rod inner end;

a support clamp with a central passage that telescopically receives the rod and wherein said support clamp is mechanically connected to said support member to limit separation of the tie rod inner end from the steering rack first end and to transmit steering forces between the rod and the steering rack when the tie rod housing fails to transmit steering forces in two directions; and including an internal clamp threaded portion on said support clamp that engages a support member threaded portion on said support member.

* * * * *